3,152,092
PREPARING PLATINUM ON ALUMINA CATALYST
Edward B. Cornelius, Swarthmore, Pa., assignor to Air Products and Chemicals, Inc., a corporation of Delaware
No Drawing. Filed Nov. 6, 1958, Ser. No. 772,181
1 Claim. (Cl. 252—466)

This invention is especially concerned with the preparation of catalyst granules comprising a predominant amount of sorptive alumina, and a minor amount of platinum by methods comprising the impregnation of sorptice alumina granules with an aqueous system characterized by a platinum compound.

Heretofore, catalysts have been prepared by impregnating an aqueous system comprising a platinum compound into a sorptive aluminaceous support. Most such impregnating systems have contained chloroplatinic acid. The six chlorine atoms of chloroplatinic acid weigh somewhat less than 110% of the one platinum atom. After sorptive alumina has been impregnated with an aqueous solution of chloroplatinic acid, it contains somewhat less than 110% as much chloride as platinum. The extent to which the chloride is lost from the carrier during the reduction of the platinum to metallic platinum is dependent in part upon such factors as the surface area of the carrier, the platinum concentration, and the reduction conditions. Various types of sorptive aluminas have surface areas within the range from about 1 to about 600 square meters per gram, but those sorptive aluminas which during the twentieth century have been employed as catalyst carriers have generally been within the range from about 50 to 350 square meters per gram. Many descriptions of catalyst preparation have ignored the surface area of the carrier and/or the surface area of the completed catalyst, and it is impossible to obtain such information about some catalysts except by repeating the preparation of such materials and making the necessary determinations thereon or by approximately estimating such values in the light of other technical literature. Substantially all of the chloride is retained by the catalyst if a conventionally pure sorptive alumina is chloroplatinate-impregnated to provide the conventional amount of platinum (that is, within the range from about 0.1% to about 2% platinum) and is reduced by the conventional method of subjecting it to a stream of dry hot hydrogen. However, some of the many descriptions of such catalyst preparations ignored the chloride content and described such catalysts as if they consisted of 0.1–2% platinum on sorptive alumina. It is possible to obtain information on the chloride content of such catalysts either by repeating the preparation of such catalysts and making the necessary determinations thereon or by approximately estimating such values in the light of other technical literatures. In other literature, the ability of sorptive alumina to retain such quantities of chloride at the conventional conditions for preparing conventional hydrogen - reduced - chloroplatinate - impregnated - alumina was well recognized. Only those ignorant of the several related fields of catalyst literature would have required analytical data to appreciate that the conventionally prepared platinum on alumina catalyst would contain chloride in an amount somewhat less than 110% of the platinum content of the catalyst. Much of the earlier literature is confusing, but eventually the distinctions between silica and alumina as carriers for halide, established in connection with isomerization, cracking, and other acid-catalyzed reactions were embodied in the descriptions of catalysts containing the chloride residue from chloroplatinate impregnation of sorptive alumina. Additional confusion arose after the discovery that in achieving a balancing of the cracking function and hydrogenation function for certain short run conversions at a specific range of reaction conditions, chloride in excess of about 110% of the platinum content was advantageous, but that fluoride or mixtures of fluoride and chloride less than 110% of the platinum content were as satisfactory as such excess chloride at an appropriately matched set of chemical reaction conditions. Such discoveries prompted research based on the established hydrogenative reforming condtions and seeking to prepare a catalyst having a suitable balance of hydrogenation function and acid-function without departing from the chloride to platinum ratios inherently present in the numerous prior art catalysts prepared by hydrogen reduction of chloroplatinate impregnated activated alumina.

In accordance with the present invention sorptive alumina granules are subjected to a wet atmosphere until the volatilizable components (as determined by ignition loss, and substantially identical to the total water content) of the alumina granules are raised from the range of from about 1% to 7% to the range of from about 12% to about 20%, such additional water being adsorbed in the internal surfaces of the activated alumina granules in such a manner as to be removable at conditions less severe than employed in the preparation of the activated alumina. The humidified granules are subjected to a spray of an aqueous system comprising a platinum material. The sprayed granules may be maintained in a humid atmosphere for a moderate time such as from 10 to 90 minutes to permit the platinum containing aqueous system to flow more uniformly throughout the large diameter pores of each sorptive alumina granule. It is believed that the solution has little opportunity to diffuse into the small diameter pores filled with moisture by the humidification step. The impregnated granules are dried at about 240° F. for about 1 hour. The dried granules are heated to a high temperature such as about 900° F., or if hydrogen sulfide is employed in the final stage heat treatment, at about 400° F. Thereafter, the granules are subjected to a hot dry hydrogen stream to reduce the platinum compound to metallic platinum.

The subject matter of the present invention may be further clarified by consideration of groups of experimental data designated as examples.

*Example 1*

A granular powder consisting of a high purity hydrate of alumina and containing a major portion of bayerite is mixed in a Lancaster type of mixer with an aqueous solution of nitric acid. For each 100 pounds of hydrated alumina powder, there are used 20.4 pounds of aqueous (32%) nitric acid prepared by diluting 9.6 pounds of 42° Baumé nitric acid with 10.8 pounds of deionized water. This corresponds to a concentration of 6.6 pounds of 100% nitric acid per 100 pounds of hydrated alumina powder. After the aqueous nitric acid solution has been added to the powder, the mulling and mixing are continued for a time sufficient to assure a uniform mixture, such as about 15 minutes. This mixture is transferred to the extruding machine and is subjected to sufficient pressure and shaping to provide round rods of an aluminaceous composition, which rods are sliced to form cylindrical granules about $3/32$ of an inch in diameter and length. Minimum dimensions for such cylindrical granules are within the range from 1 to 13 mm. The thus shaped granules are passed through a drying oven maintained at a temperature within the range from about 220° F. to about 290° F., preferably about 240° F. A hot air stream passes downwardly through the bed of granules on a moving belt in the oven, thereby rapidly removing the major portion of the excess moisture. The thus dried granules are passed through a rotating cylindrical screen adapted to remove the undersized particles.

A gravitating bed of the dried granules permits the granules to pass through a dehydration zone which is hotter (up to about 760° F.) near the exit. High humidity is maintained in the dehydration zone, as explained in Cornelius et al. 2,809,170. The hydrated alumina is converted to sorptive alumina granules in the dehydration zone. The thus prepared sorptive alumina granules have a surface area of about 300 m.$^2$/g. and contain about 5% (for example, 4.5% to about 5.5%) chemically bound or hydrate water.

Sorptive alumina adsorbs moisture from a gas, and is much used as a drying agent. The water thus sorbed onto the surface of the sorptive alumina is readily removable at moderate temperatures, such as 400° F. Repeated humidification and dehumidification steps have little influence upon the hydrate water content of the sorptive alumina because such chemically bound water is removable only at conditions very much more severe than such 400° F. treatment.

Sorptive alumina granules, whether prepared as indicated heretofore or prepared by some alternative procedure, may be impregnated with a platinum containing solution in accordance with the method of the present invention. Particular attention is directed to the step whereby relatively small pores of the sorptive alumina granules are filled with moisture, whereby less platinum is deposited in the smaller pores and most of the platinum is selectively deposited in the larger pores.

The sorptive alumina is subjected to a gas stream containing a significant amount of water vapor. The granules may pass through a humidification zone at about room temperature. Apparatus providing a downwardly zig-zagging path, such as shown in Shabaker 2,717,458 is advantageously employed for humidifying the sorptive alumina. Moisture can be added to the air circulated through the apparatus by passage through a water spray chamber. Apparatus designed as a dust collector provides a suitable water spray chamber. The circulating air is somewhat cooled as a result of the spraying and evaporation of the water, but this heat consumption is approximately balanced by the heating of the air by the granules, which are heated as a result of their absorption of water vapor. Thus, it is feasible to operate the step of humidifying the granules on a substantially continuous basis without making numerous regulations for the inevitable fluctuations in the temperature in the water inlet, air inlet or the like.

After such humidification step, the smaller micropores of the alumina granules are believed to be completely filled with water, but the larger micropores are believed to have only a surface layer of moisture. One possible theory for the superior performance of catalysts prepared by impregnating humidified granules is that the impregnating solution preferentially flows into and fills the larger micropores, where the platinum is associated with the alumina securely enough to resist migration into the smaller micropores. The platinum is able to penetrate into the smaller pores only by diffusion within the solution, but the affinity of the chloroplatinate on the alumina large pore walls, and the limited time between impregnation and drying tend to decrease such diffusion. The superior performance of the catalyst is more significant than any of the conceivable theories attempting to explain such superiority.

During the moisture absorption step, the heat of absorption of the water is dissipated from the granules into the circulating air stream and utilized for evaporation of the water in the water spray chamber of the dust collector. The humidified granules may be contacted with an aqueous solution without generating the heat which would be troublesome if freshly calcined granules were wetted.

The granules are transferred to a pressure vessel and evacuated to about ½ atmosphere pressure. Gaseous carbon dioxide is then introduced into the pressure vessel. Possibly the gas forms carbonic acid by reaction with the absorbed moisture. The carbon dioxide pressure around the granules is increased to slightly above atmospheric pressure, such as about 5 pounds per square inch gauge pressure. The pressure vessel is again evacuated, and again pressurized with gaseous carbon dioxide and the cycle is repeated for a third time.

After the granules are humidified and carbonated, they are transferred to an impregnating drum containing gaseous carbon dioxide. The granules are tumbled while being sprayed with an aqueous solution of chloroplatinic acid maintained in the carbon dioxide atmosphere. The thus impregnated granules are dried. A dryer having a downwardly zig-zagging path in an apparatus, such as shown in Shabaker 2,717,458, may be employed. The flow of materials is such that a period of from about 10 minutes to about 90 minutes elapses between the time when the granules are sprayed with the aqueous solution of chloroplatinic acid and time when the granules are heated to a temperature of 100° F. During this time interval, the chloroplatinic acid impregnated into the granules has an opportunity to migrate into the relatively large pores throughout the granules, even into the large pores near the centers of the granules. The smallest of the micropores, previously filled by the humidification step, may acquire platinum solution only by diffusion. The restricted time prior to drying permits little such diffusion. Whatever the explanation might be, it is believed that the platinum is deposited predominantly in the larger pores, and that the platinum is not deposited to a significant extent in the smallest of the micropores. The presence of the carbon dioxide atmosphere and/or carbonic acid within the large pores of the granules is believed to aid the uniform penetration of the platinum solution and thereby enhance the activity, selectivity and stability of the completed cataylst. The granules are dried at a temperature of about 235–240° F. The dried impregnated granules contain hydrate water and humidity water but substantially no excess water.

The dried granules are subjected to a suitable heat treatment to bring about a more complete bonding between the sorptive alumina carrier and the platinum component. For example, the granules may be heated in air at temperature of about 900° F. for about 2½ hours. After such final heat treatment of the granules, they are suitable for installation in a unit designed for the hydrogenative aromatizing of hydrocarbons. By the use of such catalyst industrially, it has been possible to prepare gasoline having an F–1 clear octane number of about 96 for a sufficiently prolonged period of time to provide a performance and stability record competitive with other industrially available platinum on alumina catalysts.

Sorptive alumina granules prepared by dehydration of granules containing a major portion of bayerite contain 4.5% hydrate water. Such granules, without humidification, are treated in a pressure vessel with carbon dioxide, several vacuum purges being employed to assure removal of air or the like. While still under the carbon dioxide gas pressure, the granules are dipped for a few minutes in an aqueous solution of chloroplatinic acid. The excess aqueous solution is withdrawn, and the granules are permitted to age for about 90 minutes in the presence of an atmosphere of carbon dioxide. The catalyst granules are dried and calcined and found to be only slightly better than platinum on alumina catalysts of a type employed some years ago in reforming gasoline, and significantly inferior to the catalyst prepared by the previously described combination of humidification and carbon dioxide treatment.

A catalyst is prepared by subjecting sorptive alumina granules to a humidification step until the water content of the granules (measured by the ignition loss procedure) is raised from 5% to 22%. The humidified alumina granules are dipped in an aqueous solution of chloroplatinic acid, and the thus impregnated granules are dried and calcined. The catalyst resulting from this procedure lacks the advantageous combination of activity, selectivity and stability achieved by the previously described combination of humidification and carbon dioxide treatment, but is somewhat better than platinum on alumina catalysts of a type employed some years ago in reforming gasoline.

The humidification step and the carbon dioxide treatment each separately achieves a measurable improvement of the catalyst. However, the combination of the two procedures is surprisingly and unobviously advantageous in achieving an attractive combination of activity, selectivity and stability in the catalyst. Such improved performance is believed to be attributable at least in part to the superior penetration of the platinum into the large pores without excessive deposition of the platinum in the periphery or small pores of the granules.

*Example II*

Sorptive alumina granules having minimum dimensions of about 1.4 mm., and consisting predominantly of eta alumina (resulting from the dehydration of predominantly bayerite compositions) are subjected first to carbon dioxide treatment and then to a humidification treatment to increase the sorbed water content to about 18% of the weight of the alumina. The granules are sprayed with an aqueous solution of chloroplatinic acid in a carbon dioxide atmosphere. The impregnated granules are dried, calcined, and employed in a hydrogenative reforming unit, and found to be of a quality of the same order of magnitude of the catalyst of Example I.

*Example III*

Granules of sorptive alumina containing 2% hydrate water are treated for two hours with a circulating gas stream at about 2 atmospheres' pressure at about 100° F., the circulating gas stream consisting essentially of carbon dioxide and water vapor, thus treating the granules substantially simultaneously with both water vapor and carbon dioxide. The humidified granules contain 13% sorbed water or 15% total water. After impregnating with chloroplatinic acid, drying and calcining, the platinum on chlorided alumina catalyst granules are found to be of a quality of the same order of magnitude as the catalyst of Example I. Although the combination of the humidifying treatment and the carbon dioxide treatment is essential to achieve the remarkable advantages of the present invention, the relative chronology of said two treatments is not critical.

*Example IV*

Predominantly bayerite granules are dehydrated to eta alumina granules containing 4.5% hydrate water, and having a surface area of 300 m.²/g. The bulk density of the granules is about 0.79 kg./l. The granules are treated with a circulating gas stream containing sufficient water vapor to provide at least 50% relative humidity. Sorptive alumina, even when the sorbed water is as high as about 16%, can slowly sorb additional water from relatively dry air, but the humidification of the sorptive alumina granules proceeds much more rapidly if the gas stream contains at least 50% relative humidity. The bulk density of the granules is thus increased from 0.79 to 0.95, whereby the sorbed moisture increases to about 15% of the alumina.

An aqueous solution of dinitro diamino platinum is prepared. A batch of humidified granules containing alumina 200 times the weight of the platinum in the solution is transferred to a pressure vessel and evacuated, purged with carbon dioxide, and the evacuation-purging cycle is repeated twice. A carbon dioxide atmosphere is maintained in and around the granules during the spraying with said aqueous solution of the platinum compound. The impregnated granules are dried, calcined, cooled and employed in a hydrogenative reforming unit, and are shown to be of a quality of the same order of magnitude as the catalyst granules of Example I, notwithstanding the absence of halide from the catalyst.

*Example V*

Bayerite granules are dehydrated to form eta alumina granules, which are humidified for at least 15 minutes but less than 180 minutes in a gas stream containing from 51 to 100% relative humidity at a temperature within the range from 60° F. to 100° F. The humidified granules are treated thrice to the cycle of vacuum purging and compressed gas (desirably carbon dioxide), sprayed with an aqueous solution of a platinum compound and dried at about 240° F.

The unique feature of the present example concerns the thermal treatment to bind the platinum more securely to the platinum. Instead of heating the impregnated granules in air at 900° F., the chloroplatinated alumina is heated in a dry mixture of nitrogen and hydrogen sulfide at 400° F. thus resembling the thermal treatment of 2,840,-528. The amount of hydrogen sulfide must be in excess of one-sixth the weight of the platinum and the temperature of the sulfiding must be below 1000° F.

After the thermal treatment, whether in air at 900° F. or in a nitrogen-hydrogen sulfide mixture, or otherwise, the granules are reduced to form catalyst granules comprising metallic platinum by treatment with hot dry hydrogen, generally as a part of the start-up procedure in a gasoline reforming unit.

Obviously many modifications and variations of the invention as hereinbefore set forth may be made without departing from the spirit and scope thereof, and therefore only such limitations should be imposed as are indicated in the appended claim.

What we claim is:

The method of preparing granules of platinum on alumina catalyst suitable for hydrogenative reforming of gasoline for a prolonged period of time which method consists essentially of: dehydrating bayerite to form sorptive alumina granules consisting essentially of eta alumina; subjecting the sorptive alumina granules to a combination of a humidification treatment and a carbonation treatment, said humidification treatment consisting of subjecting the granules to a gas stream having a temperature within the range from about 60° to about 100° F., said gas stream containing sufficient water vapor to provide a relative humidity within the range from 51% to 100%, whereby the sorptive alumina granules sorb sufficient water that the total volatile matter is increased from about 1% to 7% to about from 15% to 22% of the alumina, such additional water being sorbed in the internal surfaces of the sorptive alumina granules in such a manner as to be removable at conditions less severe than employed in the preparation of the sorptive alumina, and said carbonation treatment consisting of subjecting the granules to a plurality of cycles of vacuum purge and treating with gaseous carbon dioxide to substitute carbon dioxide substantially completely for the air in the pores of the granule; impregnating an aqueous solution of a platinum containing compound into the thus treated sorptive alumina granules; heating the granules at an elevated temperature, whereby the carbon dioxide and water are volatilized; and cooling the granules to provide catalyst granules consisting predominantly of dry eta alumina carrier and a minor amount of platinum containing compound.

References Cited in the file of this patent

UNITED STATES PATENTS

| | | |
|---|---|---|
| 2,759,897 | Haensel | Aug. 21, 1956 |
| 2,809,170 | Cornelius | Oct. 8, 1957 |
| 2,884,382 | Oleck | Apr. 28, 1959 |
| 2,927,903 | Nixon | Mar. 8, 1960 |
| 2,974,111 | Nixon | Mar. 7, 1961 |